(12) United States Patent
Delker (10) Patent No.: US 11,144,344 B2
(45) Date of Patent: Oct. 12, 2021

(54) TECHNIQUES FOR BEHAVIORAL PAIRING IN A TASK ASSIGNMENT SYSTEM

(71) Applicant: Afiniti, Ltd., Hamilton (BM)

(72) Inventor: Jason Delker, Olathe, KS (US)

(73) Assignee: Afiniti, Ltd., Hamilton (BM)

( * ) Notice: Subject to any disclaimer, the term of this patent is extended or adjusted under 35 U.S.C. 154(b) by 0 days.

(21) Appl. No.: 16/250,478

(22) Filed: Jan. 17, 2019

(65) Prior Publication Data
US 2020/0233700 A1    Jul. 23, 2020

(51) Int. Cl.
*G06F 9/48* (2006.01)

(52) U.S. Cl.
CPC .......... *G06F 9/4818* (2013.01); *G06F 9/4881* (2013.01)

(58) Field of Classification Search
CPC .............................. G06F 9/4881; G06F 9/4818
See application file for complete search history.

(56) References Cited

U.S. PATENT DOCUMENTS

| | | |
|---|---|---|
| 5,155,763 A | 10/1992 | Bigus et al. |
| 5,206,903 A | 4/1993 | Kohler et al. |
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,021,428 A | 2/2000 | Miloslaysky |
| 6,044,355 A | 3/2000 | Crockett et al. |
| 6,044,468 A | 3/2000 | Osmond |

(Continued)

FOREIGN PATENT DOCUMENTS

| | | |
|---|---|---|
| AU | 2008349500 C1 | 5/2014 |
| AU | 2009209317 B2 | 5/2014 |

(Continued)

OTHER PUBLICATIONS

Afiniti, "Afiniti® Enterprise Behavioral Pairing™ Improves Contact Center Performance," White Paper, retrieved online from URL: <http://www.afinitit.com/wp-content/uploads/2016/04/Afiniti_White-Paper_Web-Email.pdf> 2016, (11 pages).

(Continued)

*Primary Examiner* — Tuan C Dao
(74) *Attorney, Agent, or Firm* — Wilmer Cutler Pickering Hale and Dorr LLP (57) ABSTRACT

Techniques for behavioral pairing in a task assignment system are disclosed. In one particular embodiment, the techniques may be realized as a method for behavioral pairing in a task assignment system comprising determining, by at least one computer processor communicatively coupled to and configured to operate in the task assignment system, availability of at least one task in a queue; querying, based on at least one variable pertaining to the at least one task, at least one data source for information associated with the at least one task; receiving, from the at least one data source, the information associated with the at least one task; and pairing, based at least in part on the information associated with the at least one task, the at least one task to an agent in the task assignment system.

30 Claims, 2 Drawing Sheets

Task Assignment Method
200

(56) References Cited

U.S. PATENT DOCUMENTS

| | | |
|---|---|---|
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,519,568 B1 | 2/2003 | Harvey et al. |
| 6,535,600 B1 | 3/2003 | Fisher et al. |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,744,878 B1 | 6/2004 | Komissarchik et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,895,083 B1 | 5/2005 | Bers et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,372,952 B1 | 5/2008 | Wu et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B1 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,306,212 B2 | 11/2012 | Arora |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,831,207 B1 | 9/2014 | Agarwal |
| 8,856,869 B1 | 10/2014 | Brinskelle |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,929,537 B2 | 1/2015 | Chishti et al. |
| 8,938,063 B1 | 1/2015 | Hackbarth et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,215,323 B2 | 12/2015 | Chishti |
| 9,277,055 B2 | 3/2016 | Spottiswoode et al. |
| 9,300,802 B1 | 3/2016 | Chishti |
| 9,426,296 B2 | 8/2016 | Chishti et al. |
| 9,712,676 B1 | 7/2017 | Chishti |
| 9,712,679 B2 | 7/2017 | Chishti et al. |
| 9,781,269 B2 | 10/2017 | Chishti et al. |
| 9,787,841 B2 | 10/2017 | Chishti et al. |
| 9,930,180 B1 | 3/2018 | Kan et al. |
| 9,942,405 B1 | 4/2018 | Kan et al. |
| RE46,986 E | 8/2018 | Chishti et al. |
| 10,135,987 B1 | 11/2018 | Chishti et al. |
| RE47,201 E | 1/2019 | Chishti et al. |
| 2001/0032120 A1 | 10/2001 | Stuart et al. |
| 2001/0044896 A1 | 11/2001 | Schwartz et al. |
| 2002/0018554 A1 | 2/2002 | Jensen et al. |
| 2002/0032602 A1* | 3/2002 | Lanzillo, Jr. ............ G06Q 30/02 705/14.66 |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0059029 A1 | 3/2003 | Mengshoel et al. |
| 2003/0072467 A1* | 4/2003 | Brundage ................ G06T 1/005 382/100 |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |

(56) References Cited

U.S. PATENT DOCUMENTS

| | | |
|---|---|---|
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0239440 A1* | 10/2006 | Shaffer ............... H04M 3/523 379/265.02 |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0116240 A1 | 5/2007 | Foley et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0211881 A1 | 9/2007 | Parker-Stephen |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0144803 A1 | 6/2008 | Jaiswal et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0249083 A1 | 10/2009 | Forlenza et al. |
| 2009/0262923 A1* | 10/2009 | Anerousis ........... H04M 3/5233 379/265.09 |
| 2009/0304172 A1 | 12/2009 | Becerra et al. |
| 2009/0305172 A1 | 12/2009 | Tanaka et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142689 A1 | 6/2010 | Hansen et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2010/0333091 A1* | 12/2010 | Lin ....................... G06F 9/4843 718/100 |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2011/0206199 A1 | 8/2011 | Arora |
| 2012/0051536 A1 | 3/2012 | Chishti et al. |
| 2012/0051537 A1 | 3/2012 | Chishti et al. |
| 2012/0183131 A1 | 7/2012 | Kohler et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0051545 A1 | 2/2013 | Ross et al. |
| 2013/0054684 A1* | 2/2013 | Brazier ............... H04M 3/5231 709/203 |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0181833 A1* | 6/2014 | Bird ....................... G06F 9/5077 718/105 |
| 2014/0270133 A1 | 9/2014 | Conway et al. |
| 2014/0341370 A1 | 11/2014 | Li et al. |
| 2015/0055772 A1 | 2/2015 | Klemm et al. |
| 2015/0281448 A1 | 10/2015 | Putra et al. |
| 2016/0080573 A1 | 3/2016 | Chishti |
| 2016/0203404 A1* | 7/2016 | Cherkasova ...... G06F 16/24532 706/12 |
| 2017/0013131 A1 | 1/2017 | Craib |
| 2017/0032038 A1* | 2/2017 | Relkin ................. G06F 16/951 |
| 2017/0064080 A1 | 3/2017 | Chishti et al. |
| 2017/0064081 A1 | 3/2017 | Chishti et al. |
| 2017/0316438 A1 | 11/2017 | Konig et al. |
| 2018/0103110 A1* | 4/2018 | Koren ..................... H04L 41/12 |

FOREIGN PATENT DOCUMENTS

| | | |
|---|---|---|
| AU | 2009311534 B2 | 8/2014 |
| AU | 2015203175 A1 | 7/2015 |
| AU | 2015243001 A1 | 11/2015 |
| CN | 101093590 A | 12/2007 |
| CN | 102164073 A | 8/2011 |
| CN | 102390184 A | 3/2012 |
| CN | 102555536 A | 7/2012 |
| CN | 202965525 U | 6/2013 |
| CN | 203311505 U | 11/2013 |
| CN | 102301688 B | 5/2014 |
| CN | 102017591 B | 11/2014 |
| EP | 0493292 A2 | 7/1992 |
| EP | 0863651 A2 | 9/1998 |
| EP | 0949793 A1 | 10/1999 |
| EP | 1011974 A1 | 6/2000 |
| EP | 1032188 A1 | 8/2000 |
| EP | 1107557 A2 | 6/2001 |
| EP | 1335572 A2 | 8/2003 |
| EP | 2338270 A2 | 6/2011 |
| GB | 2339643 A | 2/2000 |
| JP | 11-098252 A | 4/1999 |
| JP | 2000-069168 A | 3/2000 |

(56) References Cited

FOREIGN PATENT DOCUMENTS

| | | | |
|---|---|---|---|
| JP | 2000-078291 A | 3/2000 | |
| JP | 2000-078292 A | 3/2000 | |
| JP | 2000-092213 A | 3/2000 | |
| JP | 2000-507420 A | 6/2000 | |
| JP | 2000-236393 A | 8/2000 | |
| JP | 2000-253154 A | 9/2000 | |
| JP | 2001-292236 A | 10/2001 | |
| JP | 2001-518753 A | 10/2001 | |
| JP | 2002-069168 A | 3/2002 | |
| JP | 2002-297900 A | 10/2002 | |
| JP | 3366565 B2 | 1/2003 | |
| JP | 2003-187061 A | 7/2003 | |
| JP | 2004-056517 A | 2/2004 | |
| JP | 2004-227228 A | 8/2004 | |
| JP | 2006-345132 A | 12/2006 | |
| JP | 2007-324708 A | 12/2007 | |
| JP | 2009-081627 A | 4/2009 | |
| JP | 2011-511533 A | 4/2011 | |
| JP | 2011-511536 A | 4/2011 | |
| JP | 2012-075146 A | 4/2012 | |
| JP | 5421928 B2 | 2/2014 | |
| JP | 5631326 B2 | 11/2014 | |
| JP | 5649575 B2 | 1/2015 | |
| JP | 2015-514268 A | 5/2015 | |
| JP | 2015-514371 A | 5/2015 | |
| MX | 316118 | 12/2013 | |
| MX | 322251 | 7/2014 | |
| NZ | 587100 B | 10/2013 | |
| NZ | 587101 B | 10/2013 | |
| NZ | 591486 B | 1/2014 | |
| NZ | 592781 B | 3/2014 | |
| PH | 1-2011-500868 | 5/2010 | |
| PH | 1-2010-501704 | 2/2014 | |
| PH | 1-2010-501705 | 2/2015 | |
| WO | WO-1999/017517 A1 | 4/1999 | |
| WO | WO-00/70849 A2 | 11/2000 | |
| WO | WO-2001/063894 A2 | 8/2001 | |
| WO | WO-2006/124113 A2 | 11/2006 | |
| WO | WO-2008/124113 A1 | 10/2008 | |
| WO | WO-2009/097018 A1 | 8/2009 | |
| WO | WO-2009/097210 A1 | 8/2009 | |
| WO | WO-2010/053701 A2 | 5/2010 | |
| WO | WO-2011/081514 A1 | 7/2011 | |
| WO | WO-2013/148453 A1 | 10/2013 | |
| WO | WO-2015/019806 A1 | 2/2015 | |
| WO | WO-2016/048290 A1 | 3/2016 | |

OTHER PUBLICATIONS

Anonymous. "Performance Based Routing in Profit Call Centers," The Decision Makers' Direct, located at www.decisioncraft.com, Issue Jun. 2002 (3 pages).
Australian Examination Report No. 2 issued in Australian Patent Application No. 2018206837, dated Jan. 16, 2019, (6 pages).
Canada Office Action issued in Canadian Patent Application No. 2713526, dated Oct. 19, 2017, (6 pages).
Canada Office Action issued in Canadian Patent Application No. 2713526, dated Oct. 25, 2016, (7 pages).
Canada Office Action issued in Canadian Patent Application No. 2993380, dated Nov. 27, 2018, (5 pages).
Canada Office Action issued in Canadian Patent Application No. 3028696, dated Jan. 23, 2019, (6 pages).
Chen, G., et al. "Enhanced Locality Sensitive Clustering in High Dimensional Space", Transactions on Electrical and Electronic Materials, vol. 15, No. 3, Jun. 25, 2014, pp. 125-129 (5 pages).
China Notification of First Office Action issued in Chinese Patent Application No. 201680070038.3, dated Nov. 26, 2018, (26 pages).
Cleveland, William S., "Robust Locally Weighted Regression and Smoothing Scatterplots," Journal of the American Statistical Association, vol. 74, No. 368, Dec. 1979, pp. 829-836 (8 pages).
Cormen, T.H., et al. "Introduction to Algorithms", Third Edition, Chapter 26 and 29, 2009 (116 pages).

European Communication Pursuant to Rule 164(2)(b) and Article 94(3) EPC issued in European Patent Application No. 09752022.5, dated Dec. 18, 2015, (7 pages).
European Extended Search Report issued by the European Patent Office for European Patent Application No. 18168620.5 dated Jun. 12, 2018 (9 pages).
European Extended Search Report issued by the European Patent Office for European Patent Application No. 18201848.1 dated Nov. 9, 2018 (8 pages).
European Extended Search Report issued by the European Patent Office for European Patent Application No. 18201856.4 dated Nov. 14, 2018 (8 pages).
European Extended Search Report issued by the European Patent Office for European Patent Application No. 18202932.2 dated Nov. 22, 2018 (8 pages).
European Extended Search Report issued by the European Patent Office for European Patent Application No. 18211624.4 dated Mar. 20, 2019 (9 pages).
European Extended Search Report issued by the European Patent Office for European Patent Application No. 18211783.8 dated Mar. 21, 2019 (9 pages).
European Extended Search Report issued by the European Patent Office for European Patent Application No. 18212022.0 dated Mar. 29, 2019 (10 pages).
European Extended Search Report issued by the European Patent Office for European Patent Application No. Application No. 19155459.1 dated Feb. 28, 2019 (8 pages).
Extended European Search Report issued by the European Patent Office for European Patent Application No. 17154781.3 dated May 4, 2017 (7 pages).
Extended European Search Report issued by the European Patent Office for European Patent Application No. 17171761.4 dated Aug. 30, 2017 (8 pages).
Gans, N. et al. (2003), "Telephone Call Centers: Tutorial, Review and Research Prospects," Manufacturing & Service Operations Management, vol. 5, No. 2, pp. 79-141, (84 pages).
India Examination Report issued in Indian Patent Application No. 3748/CHENP/2011, dated Feb. 1, 2018, (7 pages).
International Preliminary Report on Patentability and Written Opinion issued in connection with PCT Application No. PCT/US2009/066254 dated Jun. 14, 2011 (6 pages).
International Search Report and Written Opinion issued by the European Patent Office as International Searching Authority for International Application No. PCT/IB2016/001762 dated Feb. 20, 2017 (15 pages).
International Search Report and Written Opinion issued by the European Patent Office as International Searching Authority for International Application No. PCT/IB2016/001776 dated Mar. 3, 2017 (16 pages).
International Search Report and Written Opinion issued by the European Patent Office as International Searching Authority for International Application No. PCT/IB2017/000570 dated Jun. 30, 2017 (13 pages).
International Search Report and Written Opinion issued by the European Patent Office as International Searching Authority for International Application No. PCT/IB2018/000434 dated Jun. 20, 2018 (14 pages).
International Search Report and Written Opinion issued in connection with PCT Application No. PCT/IB2018/000886 dated Dec. 4, 2018 (13 pages).
International Search Report and Written Opinion issued in connection with PCT/IB2018/000907 dated Nov. 26, 2018 (11 pages).
International Search Report issued in connection with International Application No. PCT/US2013/33268 dated May 31, 2013 (2 pages).
International Search Report issued in connection with PCT Application No. PCT/US/2009/054352 dated Mar. 12, 2010, (5 pages).
International Search Report issued in connection with PCT Application No. PCT/US2008/077042 dated Mar. 13, 2009 (3 pages).
International Search Report issued in connection with PCT Application No. PCT/US2009/031611 dated Jun. 3, 2009 (5 pages).
International Search Report issued in connection with PCT Application No. PCT/US2009/066254 dated Feb. 24, 2010 (4 pages).

(56) References Cited

OTHER PUBLICATIONS

International Search Report issued in connection with PCT/US2009/061537 dated Jun. 7, 2010 (5 pages).
International Search Report issued in connection with PCT/US2013/033261 dated Jun. 14, 2013 (3 pages).
International Search Report issued in connection with PCT/US2013/33265 dated Jul. 9, 2013 (2 pages).
Japanese Office Action issued in Japanese Patent Application No. 2015-503396, dated Jun. 29, 2016 , (7 pages).
Japanese Office Action issued in Japanese Patent Application No. 2016-159338, dated Oct. 11, 2017, (12 pages).
Japanese Office Action issued in Japanese Patent Application No. 2016-189126, dated Oct. 19, 2017, (24 pages).
Japanese Office Action issued in Japanese Patent Application No. 2017-514350, dated Dec. 5, 2018, (12 pages).
Japanese Office Action issued in Japanese Patent Application No. 2018-528305, dated Oct. 17, 2018, (6 pages).
Japanese Office Action issued in Japanese Patent Application No. 2018-528306, dated Dec. 20, 2018, (12 pages).
Japanese Office Action issued in Japanese Patent Application No. 2018-528314, dated Oct. 17, 2018, (5 pages).
Koole, G. (2004). "Performance Analysis and Optimization in Customer Contact Centers," Proceedings of the Quantitative Evaluation of Systems, First International Conference, Sep. 27-30, 2004 (4 pages).
Koole, G. et al. (Mar. 6, 2006). "An Overview of Routing and Staffing Algorithms in Multi-Skill Customer Contact Centers," Manuscript, (42 pages).
Nocedal, J. and Wright, S. J., "Numerical Optimization," Chapter 16 Quadratic Programming, 2006, pp. 448-496 (50 pages).
Ntzoufras, "Bayesian Modeling Using Winbugs". Wiley Interscience, Chapter 5, Normal Regression Models, Oct. 18, 2007, pp. 155-220 (67 pages).
Philippine Subsequent Substantive Examination Report issued in Philippine Patent Application No. 1-2010-501705, dated Jul. 14, 2014, (1 page).
Philippine Subsequent Substantive Examination Report issued in Philippine Patent Application No. 1-2011-500868, dated May 2, 2014, (1 page).
Press, W. H. and Rybicki, G. B., "Fast Algorithm for Spectral Analysis of Unevenly Sampled Data," The Astrophysical Journal, vol. 338, pp. 277-280 (Mar. 1, 1989).
Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591 (8 pages).
Stanley et al., "Improving call center operations using performance-based routing strategies," Calif. Journal of Operations Management, 6(1), 24-32, Feb. 2008; retrieved from http://userwww.sfsu.edu/saltzman/Publist.html (9 pages).
Written Opinion of the International Searching Authority issued in connection with International Application No. PCT/US13/33268 dated May 31, 2013, (7 pages).
Written Opinion of the International Searching Authority issued in connection with PCT Application No. PCT/US/2009/054352 dated Mar. 12, 2010, (5 pages).
Written Opinion of the International Searching Authority issued in connection with PCT Application No. PCT/US2008/077042 dated Mar. 13, 2009, (6 pages).
Written Opinion of the International Searching Authority issued in connection with PCT Application No. PCT/US2009/031611 dated Jun. 3, 2009, (7 pages).
Written Opinion of the International Searching Authority issued in connection with PCT Application No. PCT/US2009/066254 dated Feb. 24, 2010, (5 pages).
Written Opinion of the International Searching Authority issued in connection with PCT/US2009/061537 dated Jun. 7, 2010, (10 pages).
Written Opinion of the International Searching Authority issued in connection with PCT/US2013/033261 dated Jun. 14, 2013, (7 pages).
Written Opinion of the International Searching Authority issued in connection with PCT/US2013/33265 dated Jul. 9, 2013, (7 pages).

* cited by examiner

TECHNIQUES FOR BEHAVIORAL PAIRING IN A TASK ASSIGNMENT SYSTEM

FIELD OF THE DISCLOSURE

The present disclosure generally relates to behavioral pairing and, more particularly, to techniques for behavioral pairing in a task assignment system.

BACKGROUND OF THE DISCLOSURE

A typical task assignment system algorithmically assigns tasks arriving at the task assignment center to agents available to handle those tasks. At times, the task assignment system may have agents available and waiting for assignment to tasks. At other times, the task assignment center may have tasks waiting in one or more queues for an agent to become available for assignment.

In some typical task assignment centers, tasks are assigned to agents ordered based on time of arrival, and agents receive tasks ordered based on the time when those agents became available. This strategy may be referred to as a "first-in, first-out," "FIFO," or "round-robin" strategy. For example, in an "L2" environment, multiple tasks are waiting in a queue for assignment to an agent. When an agent becomes available, the task at the head of the queue would be selected for assignment to the agent. In these typical task assignment centers, specific information about the task is not used to optimize the assignment of the task to an agent.

In view of the foregoing, it may be understood that there may be a need for a system that stores and provides specific information about tasks in order to optimize task-agent pairings in a task assignment system, in particular in a task assignment system that uses a behavioral pairing (BP) strategy.

SUMMARY OF THE DISCLOSURE

Techniques for behavioral pairing in a task assignment system are disclosed. In one particular embodiment, the techniques may be realized as a method for behavioral pairing in a task assignment system comprising determining, by at least one computer processor communicatively coupled to and configured to operate in the task assignment system, availability of at least one task in a queue; querying, by the at least one computer processor and based on at least one variable pertaining to the at least one task, at least one data source for information associated with the at least one task; receiving, by the at least one computer processor and from the at least one data source, the information associated with the at least one task; and pairing, by the at least one computer processor and based at least in part on the information associated with the at least one task, the at least one task to an agent in the task assignment system.

In accordance with other aspects of this particular embodiment, the task assignment system may be a contact center system In accordance with other aspects of this particular embodiment, the data source may be internal to the task assignment system.

In accordance with other aspects of this particular embodiment, the data source may be external to the task assignment system.

In accordance with other aspects of this particular embodiment, the at least one variable may be at least one of a telephone number or a customer identifier associated with the task.

In accordance with other aspects of this particular embodiment, the information associated with the at least one task may be a geographical location of where the at least one task originates.

In accordance with other aspects of this particular embodiment, the task assignment system may include multiple available agents and one task in queue.

In accordance with other aspects of this particular embodiment, the task assignment system may include one available agent and multiple tasks in queue.

In accordance with other aspects of this particular embodiment, the task assignment system may include multiple available agents and multiple tasks in queue.

In another particular embodiment, the techniques may be realized as a system for behavioral pairing in a task assignment system comprising at least one computer processor communicatively coupled to and configured to operate in the task assignment system, wherein the at least one computer processor is further configured to perform the steps in the above-described method.

In another particular embodiment, the techniques may be realized as an article of manufacture for behavioral pairing in a task assignment system comprising a non-transitory processor readable medium and instructions stored on the medium, wherein the instructions are configured to be readable from the medium by at least one computer processor communicatively coupled to and configured to operate in the task assignment system and thereby cause the at least one computer processor to operate so as to perform the steps in the above-described method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

A typical task assignment system algorithmically assigns tasks arriving at the task assignment center to agents available to handle those tasks. At times, the task assignment system may have agents available and waiting for assignment to tasks. At other times, the task assignment center may have tasks waiting in one or more queues for an agent to become available for assignment.

In some typical task assignment centers, tasks are assigned to agents ordered based on time of arrival, and agents receive tasks ordered based on the time when those agents became available. This strategy may be referred to as a "first-in, first-out," "FIFO," or "round-robin" strategy. For example, in an "L2" environment, multiple tasks are waiting in a queue for assignment to an agent. When an agent becomes available, the task at the head of the queue would be selected for assignment to the agent. In these typical task assignment centers, specific information about the task is not used to optimize the assignment of the task to an agent.

In view of the foregoing, it may be understood that there may be a need for a system that stores and provides specific information about tasks in order to optimize task-agent pairings in a task assignment system, in particular in a task assignment system that uses a behavioral pairing (BP) strategy.

Figure 1:
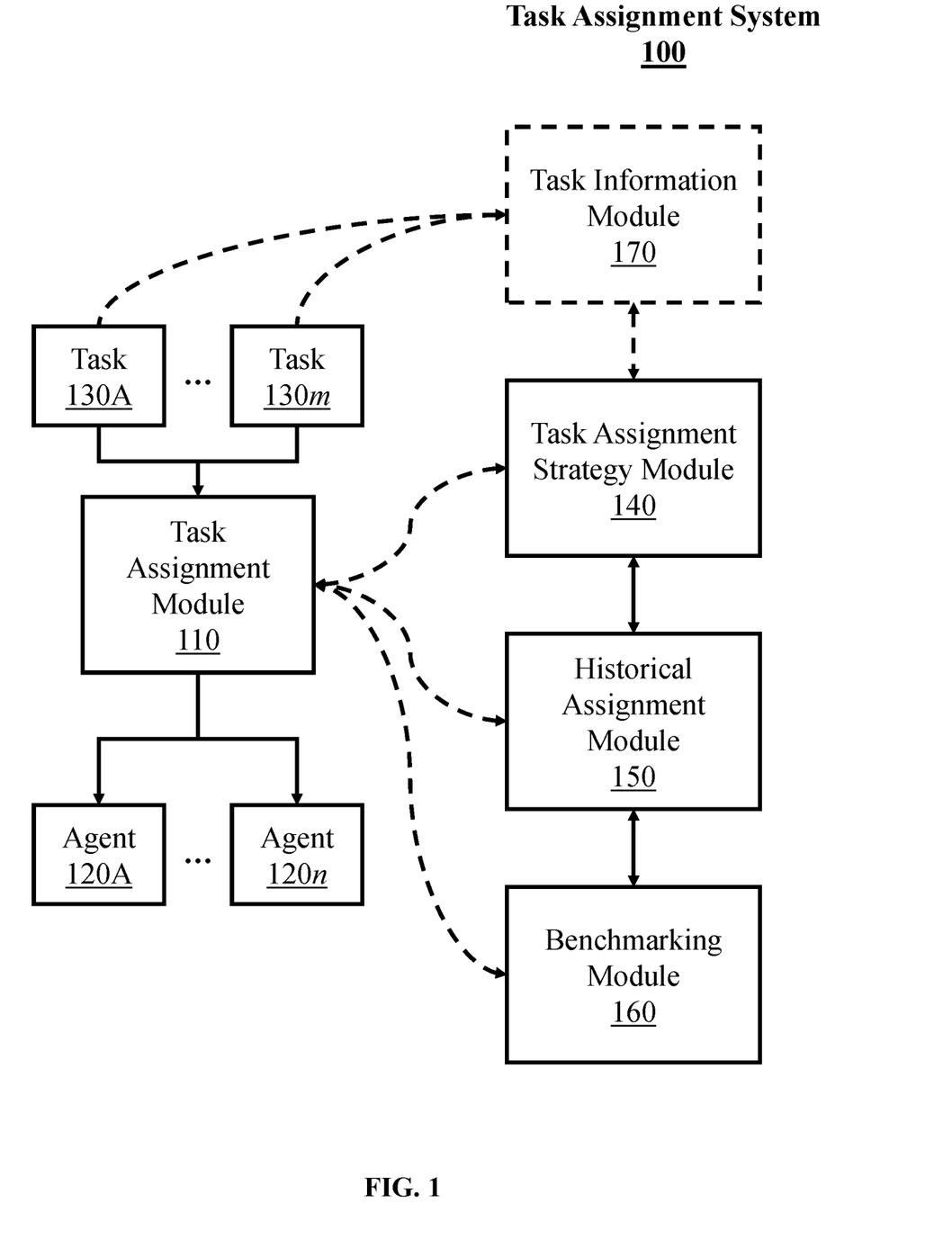
FIG. 1 shows a block diagram of a task assignment system according to embodiments of the present disclosure.

FIG. 1 shows a block diagram of a task assignment system 100 according to embodiments of the present disclosure. The description herein describes network elements, computers, and/or components of a system and method for benchmarking pairing strategies in a task assignment system that may include one or more modules. As used herein, the term "module" may be understood to refer to computing software, firmware, hardware, and/or various combinations thereof. Modules, however, are not to be interpreted as software which is not implemented on hardware, firmware, or recorded on a non-transitory processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the task assignment system 100 may include a task assignment module 110. The task assignment system 100 may include a switch or other type of routing hardware and software for helping to assign tasks among various agents, including queuing or switching components or other Internet-, cloud-, or network-based hardware or software solutions.

The task assignment module 110 may receive incoming tasks. In the example of FIG. 1, the task assignment system 100 receives m tasks over a given period, tasks 130A-130m. Each of the m tasks may be assigned to an agent of the task assignment system 100 for servicing or other types of task processing. In the example of FIG. 1, n agents are available during the given period, agents 120A-120n. m and n may be arbitrarily large finite integers greater than or equal to one. In a real-world task assignment system, such as a contact center, there may be dozens, hundreds, etc. of agents logged into the contact center to interact with contacts during a shift, and the contact center may receive dozens, hundreds, thousands, etc. of contacts (e.g., calls) during the shift.

In some embodiments, a task assignment strategy module 140 may be communicatively coupled to and/or configured to operate in the task assignment system 100. The task assignment strategy module 140 may implement one or more task assignment strategies (or "pairing strategies") for assigning individual tasks to individual agents (e.g., pairing contacts with contact center agents).

A variety of different task assignment strategies may be devised and implemented by the task assignment strategy module 140. In some embodiments, a FIFO strategy may be implemented in which, for example, the longest-waiting agent receives the next available task (in L1 environments) or the longest-waiting task is assigned to the next available agent (in L2 environments). Other FIFO and FIFO-like strategies may make assignments without relying on information specific to individual tasks or individual agents.

In other embodiments, a PBR strategy for prioritizing higher-performing agents for task assignment may be implemented. Under PBR, for example, the highest-performing agent among available agents receives the next available task. Other PBR and PBR-like strategies may make assignments using specific information about agents but without necessarily relying on specific information about tasks.

In yet other embodiments, a BP strategy may be used for optimally assigning tasks to agents using specific information about either tasks or agents, or both. Various BP strategies may be used, such as a diagonal model BP strategy or a network flow BP strategy. These task assignment strategies and others are described in detail for the contact center context in, e.g., U.S. Pat. Nos. 9,300,802 and 9,930,180, which are hereby incorporated by reference herein. BP strategies may be applied in an "L1" environment (agent surplus, one task; select among multiple available/idle agents), an "L2" environment (task surplus, one available/idle agent; select among multiple tasks in queue), and an "L3" environment (multiple agents and multiple tasks; select among pairing permutations).

When the task assignment system 100 uses a BP strategy that relies on specific information about incoming tasks, a task information module 170 may be communicatively coupled to and/or configured to operate in the task assignment system 100 via the task assignment strategy module 140. In some embodiments, the task information module 170 may store predetermined specific information about a task (e.g., information about a caller based on the phone number from which a call originates, or information about a task based on an identifier of a task such as a claim number, account number, transaction number, etc.).

In some embodiments, the task information module 170 may be co-located with the task assignment system 100. For example, the task information module 170 may be a server located on the premises of a call center.

In other embodiments, the task information module 170 may be a first-party server that is geographically remote from the task assignment system 100, such as a customer relationship management ("CRM") database.

In yet other embodiments, the task information module 170 may be a third-party server that is geographically remote from the task assignment system 100, and it may use a third-party authentication system or third-party application programming interface (API). Remotely stored third party databases may include useful task information such as demographic, psychographic, census, behavioral, or social media data, which may be stored in third-party government, commercial, vendor, or social media databases. The data may be retrieved when an action is taken by a potential task (or contact, customer, etc.) prior to the task arriving at the task assignment system 100 or at some time after the task arrives at the task assignment system 100.

For instance, a caller may place a call to a call center from a cellular phone or uses a "click-to-call" button on a browser or a mobile application ("app"). In parallel with initiating the call, the user's device may be configured to transfer data to the task assignment system 100 or, in particular, to the task information module 170. For example, the user's customer identification and geographical location may be transmitted. Consequently, the task assignment system 100 may be informed of the location from which a particular customer is calling or is about to call. It is to be noted that there may be cases where, although the initiation of a call may transmit information to the task information module 170, the task itself may be terminated prior to arriving at the task assignment system 100. In other words, the caller does not make contact with the task assignment system 100 and no agent needs to be assigned to that potential task.

In some embodiments, when the task arrives at the task assignment system 100, the task assignment strategy module 140 may query the task information module 170 for specific information associated with the task. In other embodiments, the task assignment strategy module 140 may query the task information module 170 prior to the task arriving at the task assignment system 100 (e.g., when a contact center system is notified of a user-initiated request to contact the contact center). A query to the task information module 170 may be based on at least one variable such as a phone number, customer number, account number, case number, claim number, task identifier, or another identifier pertaining to the task. The variable upon which the query is based may not be predetermined or known prior to the task arriving at the task assignment system 100. In yet other embodiments, the task information module 170 may provide specific information associated with a task to the task assignment strategy module 140 prior to the task arriving at the task assignment system 100 (e.g., when a user initiates a request to contact a contact center).

With the specific information associated with the task, the task assignment strategy module 140 thus may better inform the BP strategy about the task such that the task gets assigned to the most appropriate available agent. The specific information may also inform an agent script or an interaction with the agent. Therefore, the overall performance of the task assignment system 100 may be improved.

In some embodiments, the task information module 170 may be local to or included in the task assignment system 100 such that specific information associated with tasks stored in the task information module 170 may be transferred readily to the task assignment strategy module 140. In other embodiments, the task information module 170 may be one or more data sources external to the task assignment system 100. Such external data sources should not be within a firewall or other shared security perimeter of the task assignment system 100, such as a remotely accessible third-party government, commercial, vendor, social media database, etc. In some embodiments, another example of an external data source may also be a device of the user who initiated the task.

The task assignment strategy module 140 may perform a remote lookup to access data stored in external data sources. The task assignment strategy module 140 may query more than one data source at the same time, in parallel. The remote data lookup may be performed without increasing the average overall time that elapses in making a task assignment (e.g., without increasing the average wait time of a caller to a call center). In some embodiments, the average wait time may increase, but by a limited amount (e.g., by not more than 5 seconds, 20 seconds, etc.). For example, the task assignment system 100 may track the average remote lookup time (e.g., 500 milliseconds, 2 seconds, etc.) and the average waiting time of a task or caller (e.g., 700 milliseconds, 3 seconds, etc.), to determine whether a remote lookup will complete within the time available to assign the task within predetermined service level agreements (SLAs). In some embodiments, the task assignment system 100 may initiate a remote lookup prior to the task arrival in a queue. For example, the task assignment system 100 may initiate a remote lookup of a caller based on the caller's phone number while the caller is still connected to an initial IVR system but before the caller reaches a queue and becomes ready for assignment to an agent.

In some embodiments, a historical assignment module 150 may be communicatively coupled to and/or configured to operate in the task assignment system 100 via other modules such as the task assignment module 110 and/or the task assignment strategy module 140. The historical assignment module 150 may be responsible for various functions such as monitoring, storing, retrieving, and/or outputting information about agent task assignments that have already been made. For example, the historical assignment module 150 may monitor the task assignment module 110 to collect information about task assignments in a given period. Each record of a historical task assignment may include information such as an agent identifier, a task or task type identifier, outcome information, or a pairing strategy identifier (i.e., an identifier indicating whether a task assignment was made using a BP pairing strategy or some other pairing strategy such as a FIFO or PBR pairing strategy).

In some embodiments and for some contexts, additional information may be stored. For example, in a call center context, the historical assignment module 150 may also store information about the time a call started, the time a call ended, the phone number dialed, and the caller's phone number. For another example, in a dispatch center (e.g., "truck roll") context, the historical assignment module 150 may also store information about the time a driver (i.e., field agent) departs from the dispatch center, the route recommended, the route taken, the estimated travel time, the actual travel time, the amount of time spent at the customer site handling the customer's task, etc.

In some embodiments, the historical assignment module 150 may generate a pairing model or similar computer processor-generate model based on a set of historical assignments for a period of time (e.g., the past week, the past month, the past year, etc.), which may be used by the task assignment strategy module 140 to make task assignment recommendations or instructions to the task assignment module 110. In other embodiments, the historical assignment module 150 may send historical assignment information to another module such as the task assignment strategy module 140 or the benchmarking module 160.

In some embodiments, a benchmarking module 160 may be communicatively coupled to and/or configured to operate in the task assignment system 100 via other modules such as the task assignment module 110 and/or the historical assignment module 150. The benchmarking module 160 may benchmark the relative performance of two or more pairing strategies (e.g., FIFO, PBR, BP, etc.) using historical assignment information, which may be received from, for example, the historical assignment module 150. In some embodiments, the benchmarking module 160 may perform other functions, such as establishing a benchmarking schedule for cycling among various pairing strategies, tracking cohorts (e.g., base and measurement groups of historical assignments), etc. The techniques for benchmarking and other functionality performed by the benchmarking module 160 for various task assignment strategies and various contexts are described in later sections throughout the present disclosure. Benchmarking is described in detail for the contact center context in, e.g., U.S. Pat. No. 9,712,676, which is hereby incorporated by reference herein.

In some embodiments, the benchmarking module 160 may output or otherwise report or use the relative performance measurements. The relative performance measurements may be used to assess the quality of the task assignment strategy to determine, for example, whether a different task assignment strategy (or a different pairing model) should be used, or to measure the overall performance (or performance gain) that was achieved within the task assignment system 100 while it was optimized or otherwise configured to use one task assignment strategy instead of another.

Figure 2:
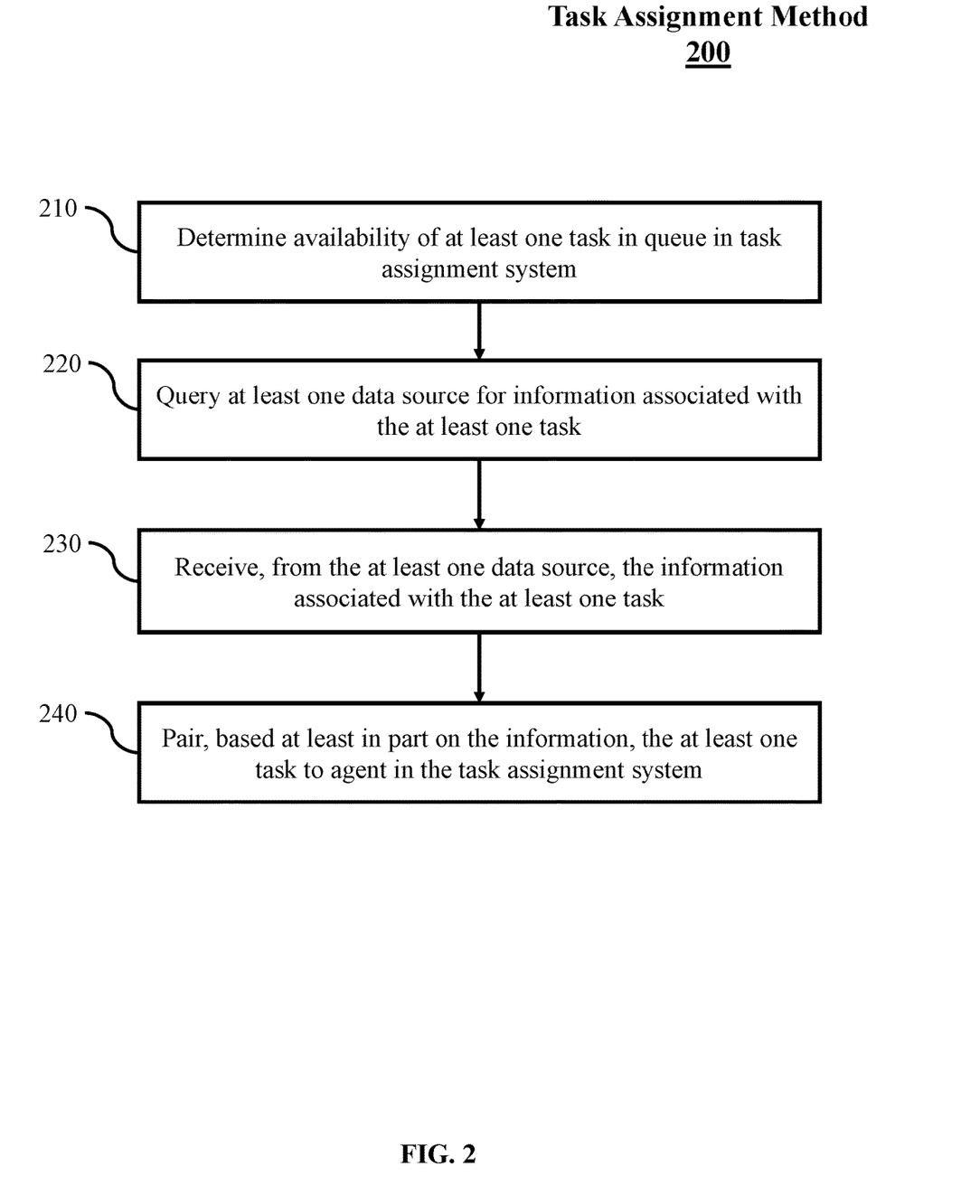
FIG. 2 shows a flow diagram of a task assignment method according to embodiments of the present disclosure.

FIG. 2 shows a task assignment method 200 according to embodiments of the present disclosure. Task assignment method 200 may begin at block 210.

At block 210, at least one task may be determined to be in queue for assignment in a task assignment system (e.g., task assignment system 100). Task assignment method 200 may then proceed to block 220.

At block 220, at least one data source may be queried for information associated with the at least one task in queue, based on at least one variable pertaining to the at least one task. The information associated with the at least one task may include demographic, psychographic, census, behavioral, or social media data, which may be stored in third-party government, commercial, vendor, or social media databases. The at least one variable pertaining to the at least one task may include at least one geographical location of where the at least one task originates, a customer identification of a user initiating the at least one task, a phone number of a caller associated with the task, etc. Task assignment method 200 may then proceed to block 230.

At block 230, the information associated with the at least one task may be received from the at least one data source. Task assignment method 200 may then proceed to block 240.

At block 240, based at least in part on the information associated with the at least one task, the at least one task may be paired with an agent in the task assignment system.

After pairing the at least one task to an agent, task assignment method 200 may end.

At this point it should be noted that task assignment in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with task assignment in accordance with the present disclosure as described above. Alternatively, one or more processors operating in accordance with instructions may implement the functions associated with task assignment in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for behavioral pairing in a task assignment system comprising:
    determining, by at least one computer processor communicatively coupled to and configured to operate in the task assignment system, availability of at least one task in a queue;
    querying, by the at least one computer processor and based on at least one variable pertaining to the at least one task, at least one data source for information associated with the at least one task, wherein the query is performed within a first time period, wherein the first time period is determined according to a service level agreement associated with the task assignment system and the at least one task;
    receiving, by the at least one computer processor and from the at least one data source, the information associated with the at least one task;
    pairing, during the first time period and based at least in part on the information associated with the at least one task, one or more tasks in the queue other than the at least one task to a first agent in the task assignment system by a pairing strategy associated with the task assignment system; and
    pairing, by the at least one computer processor and based at least in part on the information associated with the at least one task, the at least one task to a second agent in the task assignment system by the pairing strategy.

2. The method of claim 1, wherein the task assignment system is a contact center system.

3. The method of claim 1, wherein the data source is internal to the task assignment system.

4. The method of claim 1, wherein the data source is external to the task assignment system.

5. The method of claim 1, wherein the at least one variable is at least one of a telephone number or a customer identifier associated with the at least one task.

6. The method of claim 1, wherein the information associated with the at least one task is a geographical location of where the at least one task originates.

7. The method of claim 1, wherein the task assignment system includes multiple available agents and one task in queue.

8. The method of claim 1, wherein the task assignment system includes one available agent and multiple tasks in queue.

9. The method of claim 1, wherein the task assignment system includes multiple available agents and multiple tasks in queue.

10. A system for behavioral pairing in a task assignment system comprising:
    at least one computer processor communicatively coupled to and configured to operate in the task assignment system, wherein the at least one computer processor is further configured to:
        determine availability of at least one task in a queue;
        query, based on at least one variable pertaining to the at least one task, at least one data source for information associated with the at least one task, wherein the query is performed within a first time period, wherein the first time period is determined according to a service level agreement associated with the task assignment system and the at least one task;

receive, from the at least one data source, the information associated with the at least one task;

pair, during the first time period and based at least in part on the information associated with the at least one task, one or more tasks in the queue other than the at least one task to a first agent in the task assignment system by a pairing strategy associated with the task assignment system; and pair, based at least in part on the information associated with the at least one task, the at least one task to a second agent in the task assignment system by the pairing strategy.

11. The system of claim 10, wherein the task assignment system is a contact center system.

12. The system of claim 10, wherein the data source is internal to the task assignment system.

13. The system of claim 10, wherein the data source is external to the task assignment system.

14. The system of claim 10, wherein the at least one variable is at least one of a telephone number or a customer identifier associated with the at least one task.

15. The system of claim 10, wherein the information associated with the at least one task is a geographical location of where the at least one task originates.

16. The system of claim 10, wherein the task assignment system includes multiple available agents and one task in queue.

17. The system of claim 10, wherein the task assignment system includes one available agent and multiple tasks in queue.

18. The system of claim 10, wherein the task assignment system includes multiple available agents and multiple tasks in queue.

19. An article of manufacture for behavioral pairing in a task assignment system comprising:

a non-transitory processor readable medium; and instructions stored on the medium;

wherein the instructions are configured to be readable from the medium by at least one computer processor communicatively coupled to and configured to operate in the task assignment system and thereby cause the at least one computer processor to operate so as to:

determine availability of at least one task in a queue;

query, based on at least one variable pertaining to the at least one task, at least one data source for information associated with the at least one task, wherein the query is performed within a first time period, wherein the first time period is determined according to a service level agreement associated with the task assignment system and the at least one task;

receive, from the at least one data source, the information associated with the at least one task;

pair, during the first time period and based at least in part on the information associated with the at least one task, one or more tasks in the queue other than the at least one task to a first agent in the task assignment system by a pairing strategy associated with the task assignment system; and pair, based at least in part on the information associated with the at least one task, the at least one task to a second agent in the task assignment system by the pairing strategy.

20. The article of manufacture of claim 19, wherein the task assignment system is a contact center system.

21. The article of manufacture of claim 19, wherein the data source is internal to the task assignment system.

22. The article of manufacture of claim 19, wherein the data source is external to the task assignment system.

23. The article of manufacture of claim 19, wherein the at least one variable is at least one of a telephone number or a customer identifier associated with the at least one task.

24. The article of manufacture of claim 19, wherein the information associated with the at least one task is a geographical location of where the at least one task originates.

25. The article of manufacture of claim 19, wherein the task assignment system includes multiple available agents and one task in queue.

26. The article of manufacture of claim 19, wherein the task assignment system includes one available agent and multiple tasks in queue.

27. The article of manufacture of claim 19, wherein the task assignment system includes multiple available agents and multiple tasks in queue.

28. The method of claim 1, further comprising:

determining whether a query can be performed during the first time period;

wherein the querying is further based on determining that the query can be performed during the first time period.

29. The system of claim 10, wherein the at least one computer processor is further configured to:

determine whether a query can be performed during the first time period;

wherein the querying is further based on determining that the query can be performed during the first time period.

30. The article of manufacture of claim 19, wherein the instructions further cause the at least one computer processor to operate so as to:

determine whether a query can be performed during the first time period;

wherein the querying is further based on determining that the query can be performed during the first time period.

* * * * *